Aug. 6, 1935.          B. SASSEN          2,010,378
                    HYDRAULIC POWER UNIT
                    Filed July 28, 1931          5 Sheets—Sheet 2

Inventor
BERNARD SASSEN
By A. H. Parsons
Attorney

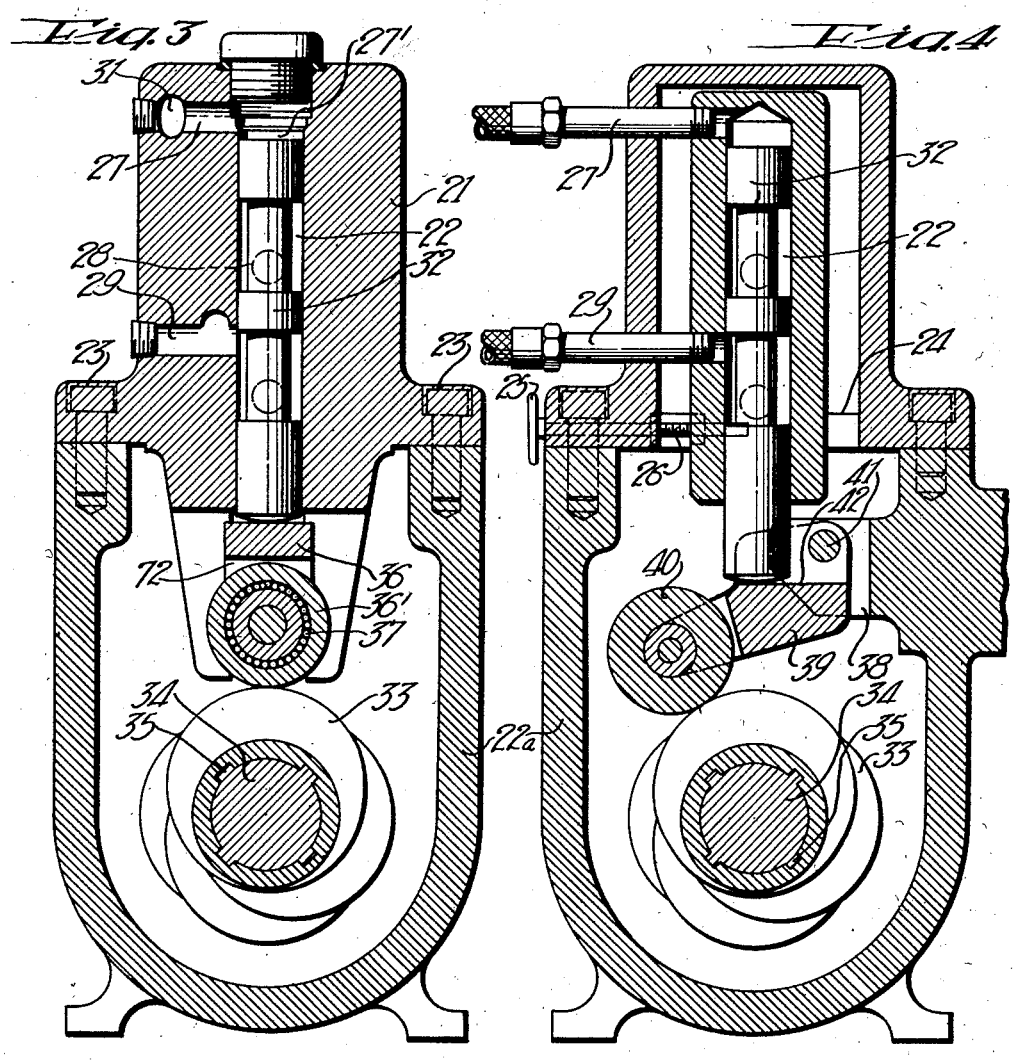

Aug. 6, 1935.  B. SASSEN  2,010,378
HYDRAULIC POWER UNIT
Filed July 28, 1931  5 Sheets-Sheet 4
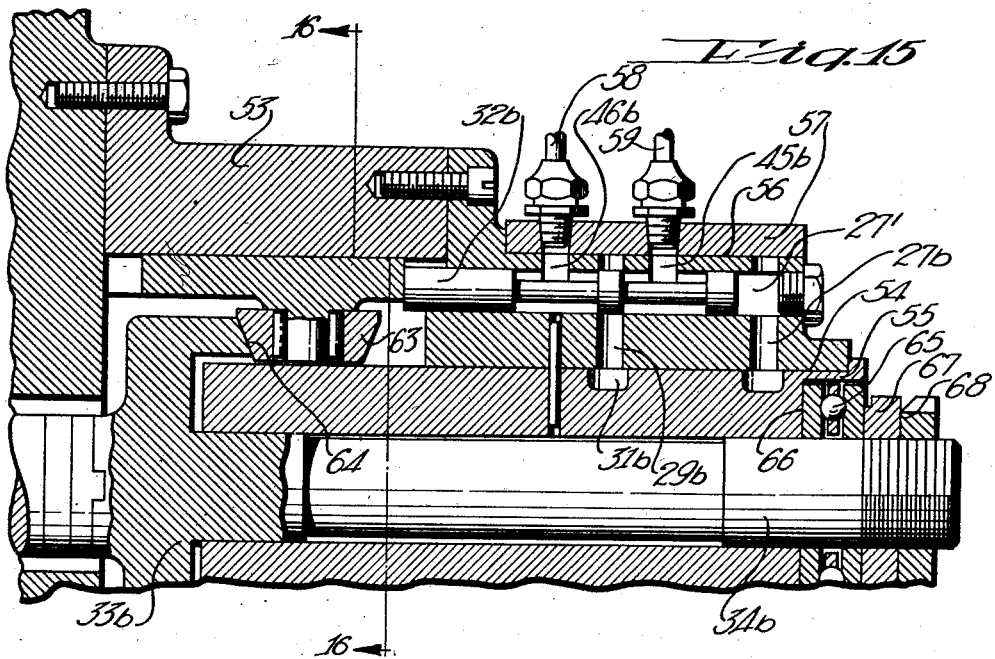
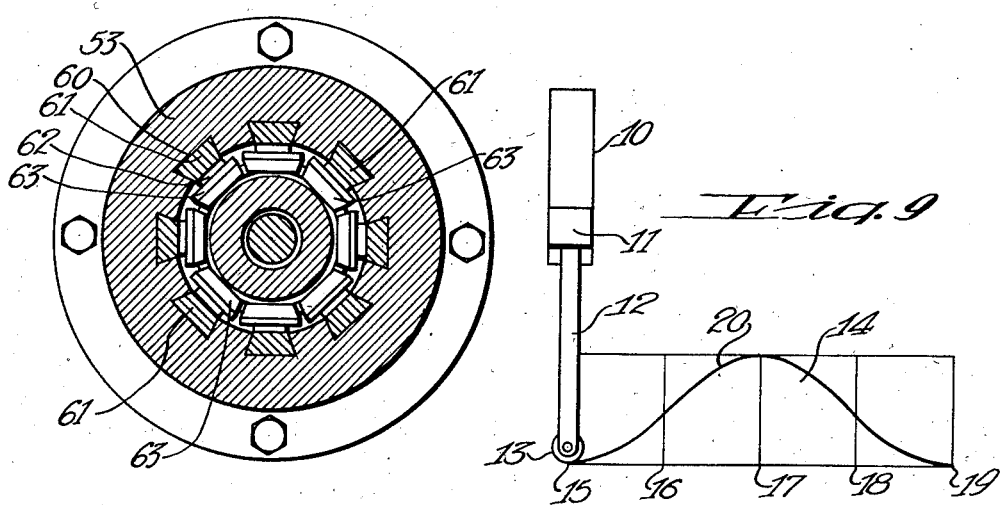
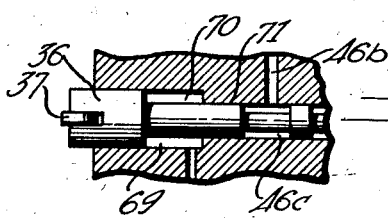
Inventor
BERNARD SASSEN
By
A. H. K. Parsons
Attorney

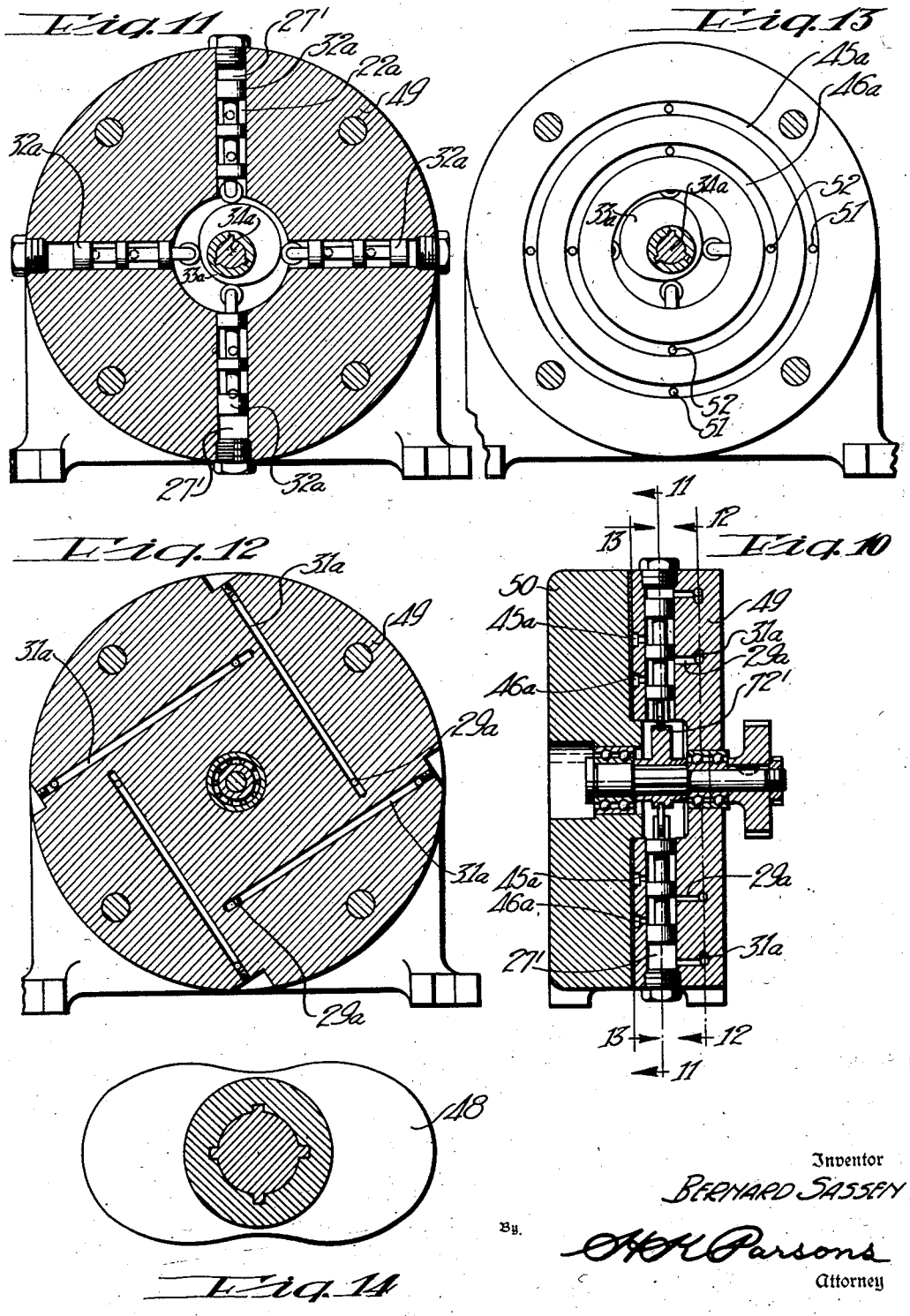

Patented Aug. 6, 1935

2,010,378

UNITED STATES PATENT OFFICE 2,010,378

HYDRAULIC POWER UNIT

Bernard Sassen, Cincinnati, Ohio, assignor to The Cincinnati Milling Machine Company, Cincinnati, Ohio, a corporation of Ohio Application July 28, 1931, Serial No. 553,518

12 Claims. (Cl. 103—169)

This invention relates to improvements in hydraulic power units and has particular reference to an improved structure which may be selectively utilized either for creation of a hydraulic pressure or flow, or alternatively for conversion of hydraulic flow into an ordinary mechanical force.

One of the objects of the present invention is the provision of an improved multiple cylinder unit utilizable as either a motor or pump which will satisfactorily produce a constant and uniform power output.

A further object of this invention is the provision of a simplified self-contained structure in which dual functioning of certain of the elements will serve to minimize the total of moving parts of the mechanism.

Another object of the invention is the provision of a simple and efficient mechanism of the general character above set forth which will be particularly adapted for adjustment to vary the effective displacement of the unit per cycle.

A still further object of the invention is the provision of a pump in which the pistons may be maintained in contact with their actuators by hydraulic means, the pressure of which will be automatically maintained from the output pressure line of the pump itself, thereby eliminating the use of mechanical parts or other external pressure means for performing this function.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

In the drawings:

Figure 3 is a section on the line 3—3 of Figure 2 showing a constant power input type of unit.

Figure 4 is a similar sectional view illustrating an adjustable type of unit.

Figure 5 is an enlarged view of one of the actuating cams of the unit diagrammatically indicating the several effective areas thereof.

Figure 6 is a diagram showing the effective motion of an individual plunger.

Figure 9 is a diagram of a basic working unit comprising a piston and its associated cam.

Figure 10 is a sectional view showing a radial type pump.

Figure 11 is a section on the line 11—11 of Figure 10.

Figure 12 is a section on the line 12—12 of Figure 10.

Figure 13 is a view on the line 13—13 of Figure 10.

Figure 14 is a detail of a double lobed cam.

Figure 15 is a sectional view of a modified form of pump using a face cam.

Figure 16 is a section on the line 16—16 of Figure 15.

Figure 17 is a detail view showing the arrangement for maintaining contact between plunger and its actuator by hydraulic pressure.

In the creation of an hydraulic power unit, whether it be pump or motor, the prime consideration is a transmittal of an even flow of power. In units of the piston cylinder type an actuator has generally been utilized which will effect a sinusoidal or modified sinusoidal motion of the piston thereby obtaining a movement which resulted in the rate of displacement varying in accordance with a sine curve which could never result in a uniform flow even if the number of pistons were multiplied beyond practical limits and were equally phased with respect to each other because the sine curve is not of such a nature that the summation of several sine curves when superpositioned, one upon another, in any phased relation, will ever result in a straight line and, therefore, since this sum must vary from a straight line so the rate of displacement must vary, resulting in an uneven flow of power.

In the present invention this has been obviated by providing, as a fundamental unit of the structure, a piston and a cam actuator to reciprocate it in which the cam is of such a nature or so formed that it will impart to the piston a uniformly accelerated motion during the first one-half of its stroke or, assuming that one complete reciprocation of the piston constitutes a cycle, it will be uniformly accelerated during the first quarter of the cycle and then uniformly decelerated during the second quarter of a cycle.

Figures 2, 7, 8:
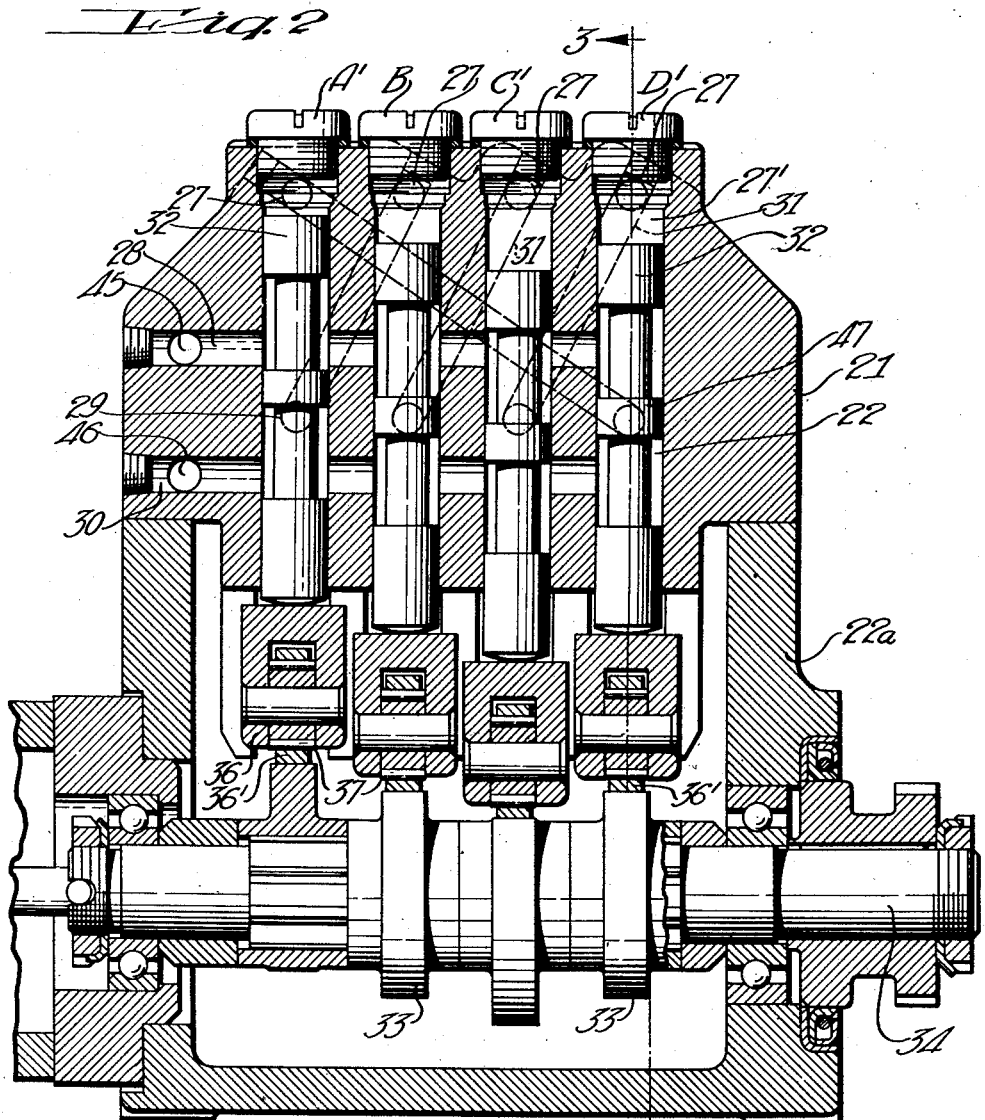
Figure 2 represents a vertical sectional view thereof.
Figure 7 is a velocity diagram showing the effective output of an individual plunger.
Figure 8 is a composite diagram showing the manner of producing constant and uniform discharge of the unit by a composite action of the several plungers.

This is best illustrated by referring to the diagram in Figure 9 in which the reference numeral 10 indicates a cylinder having reciprocably mounted therein a piston 11. A piston rod 12 is attached at one end to the piston and has an antifrictionally mounted roller 13 in the other end. For the purposes of explanation let it be assumed that a plate cam 14 is mounted for horizontal reciprocation past the end of the piston rod. The time of this movement may be any given period of time depending upon the rate of uniform velocity given to the cam 14. The length of the cam may be divided into four stages, as from 15 to 16, 16 to 17, 17 to 18 and 18 to 19. The contoured surface 20 of the cam is then so formed that between the ordinates 15 and 16 the piston rod 12 and piston 11 will be moved upward at uniform acceleration and from 16 to 17 the shape is such that the upward movement will be continued but at a uniform deceleration. At 17 the piston will have instantaneous zero velocity. From 17 to 18 the piston will move downward at a uniform acceleration and from 18 to 19 at a uniform deceleration. It will therefore, be seen that as the piston moves upward during the first quarter of a cycle that the rate of displacement will be uniformly increased from zero to maximum and during the next quarter of a cycle it will be uniformly decreased from maximum to zero. If this rate of displacement is now plotted, as shown in Figure 7, it will be seen that the rate increases and decreases in a straight line rather than in a sine curve, as mentioned in connection with sinusoidal motion.

Since a cam has been formed which will give a rate of displacement which, when plotted, results in a straight line it becomes possible to combine a second piston and cam of the same nature therewith and in such phased relation that as one is uniformly increasing in its rate of displacement the other is uniformly decreasing and the superposition, one curve on the other, in proper phased relation results in the sum of the two displacements at any instantaneous point being constant throughout the cycle and therefore, the power output will be uniform.

From this it will be seen that by the combination of two of these fundamental units that a uniform flow of power may be produced but since each piston must pass through the last half cycle without transmitting power, it is necessary, in order to obtain a continuous flow of power, to utilize a quarternary number of pistons and their accompanying actuating means, or in other words, four pistons or any multiple thereof, to form a complete operative unit suitable for commercial purposes.

Figure 1:
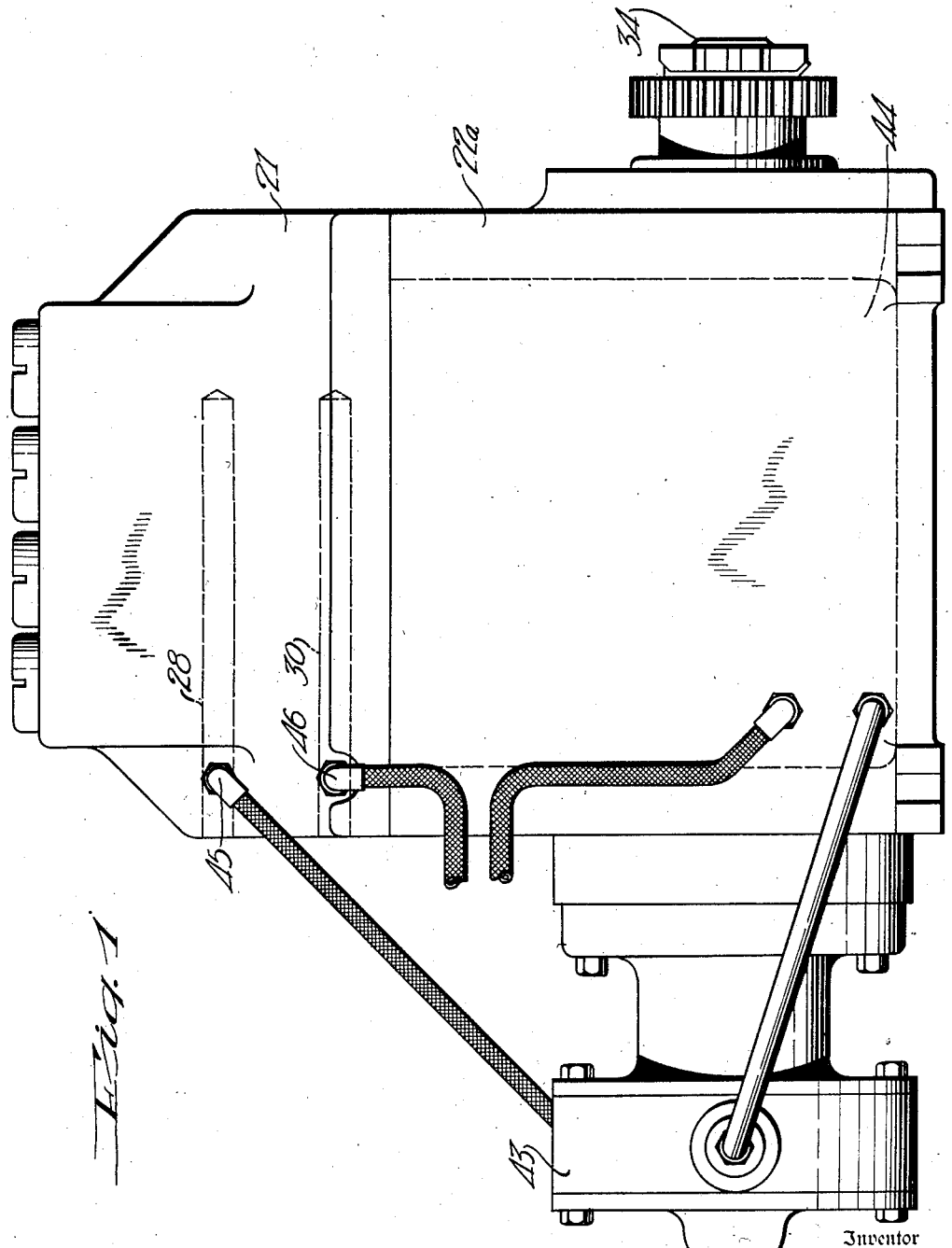
Figure 1 represents a view in elevation of the pump or motor unit with certain of the porting passages indicated in dotted lines.

The four pistons and actuating means comprising the smallest operative unit may be embodied in commercial structures in various arrangements and forms, depending upon the shape desired or the use to which it is to be put, without departing from the fundamental idea. For instance, they may be arranged in line, as shown in Figures 1, 2 and 3, using four pistons and four cams; in a radial arrangement as shown in Figures 11 and 12; or in a longitudinal arrangement as shown in Figure 15. In Figures 1, 2 and 3, the reference numeral 21 designates the main cylinder frame or casting having a plurality of cylinders 22 formed therein which have been here indicated as four in number although it will be noted that a multiple of this number of cylinders may be employed depending on the relative inter-porting and the phasing of the actuating or power transmitting cams therefor, as hereinafter described. The cylinder casting 21 is supported on the main frame unit 22a and may either be rigidly secured in place as by bolts 23 or may be mounted on the ways 24 and adjustable thereon as by the pilot wheel 25 and screw 26, for example, as shown in Figure 4. This adjustment serves to vary the volumetric output or rate of transfer of energy from hydraulic to mechanical or the reverse, as will hereinafter be more fully described. In either event the cylinders 22 have at the termini thereof the ports 27 leading to chamber 27' and have, in addition, a plurality of ports respectively numbered 28, 29, and 30 at points intermediate the length of the cylinders. Passages or conduits 31 formed diagonally as respects the cylinders serve to connect the port 27 of one cylinder with port 29 of a sequentially operating cylinder, though whether this connection be between immediately adjacent cylinders or a staggered coupling of the respective cylinders is dependent entirely upon the cycle of movement of the individual pistons 32 of the cylinders as determined by the cam device 33 carried by shaft 34.

It will be noted that shaft 34 has been shown as formed with a series of splines 35 which may, for example, be four or any number to the end that the several cams 33 may all be correspondingly shaped and a definite phasing thereof automatically obtained by mounting each on the shaft at 90° to the adjacent cam in the event that a four cylinder pump or motor mechanism such, as here specifically illustrated, is being utilized.

In the form of the invention shown in Figure 3 the cams cooperate with slide blocks 36 carrying rollers 36' mounted on antifriction bearings 37, preferably of the type known as needle bearings, the rollers contacting directly with the cam and the blocks, in turn, engaging the lower ends of the pistons 32. The blocks may be provided with guide flanges 72 which also serve to prevent twisting of the roller relative to the cam.

In the form of the invention shown in Figure 4, however, in which it is desired to variably determine the volumetric capacity of the mechanism per unit of time, use is made of the supplemental frame 38 having pivoted thereto the levers 39 terminally provided with the cam contacting rollers 40 and having intermediate the roller 40 and lever fulcrum 41 the seats 42 for the lower ends of the pistons. In this form of the invention, therefore, as the cylinder block is given a bodily lateral movement as respects the shaft 34, the distance between fulcrum 41 to the piston will be varied and consequently movement toward the right, as viewed in Figure 4, will decrease the amplitude of reciprocation imparted to the piston 32 while conversely, movement to the left will increase its amplitude of movement for a given or constant amount of oscillation of lever 39.

As shown in Figure 5 the cam of Figure 9 may be wrapped around an axis so that during substantially 90° of rotation, as from 15' to 16', it will present to the piston directly or indirectly a rise or outward movement of uniform acceleration followed by a subsequent 90° of rotation, as from 16' to 17', with an accompanying rise of uniform deceleration, this 180° of movement comprising the output stroke in the case the mechanism is being used as a pump or the exhaust if it is being utilized as a motor. The remainder of the cam, as from 17' to 18', effects a 90° fall at uniform acceleration followed by a final 90° fall of uniform deceleration.

It will thus be seen that for the first 90° of the rise or fall of the cam the velocity of the rise or fall increases from zero to a maximum and during the second 90° movement it decreases from the maximum to zero and that consequently as respects a pair of cams jointly controlling either the intake or the output stroke of a pair of pistons if they are phased 90° one from the other, the combined volumetric rate of displacement or velocity will, at all times, be constant.

In Figure 7 the velocity of a single plunger was diagrammatically shown while in Figure 8 the lines A, B, C and D represent respectively the velocities of the plungers and consequently their rate of displacement in the cylinders A', B', C', and D', respectively. From this it will be noted that for each 90° of rotation of the control or determining shaft 34 the combined rate of volumetric output will be the sum of the rates of displacement of two co-acting cylinders. This may be, for example, the sum of the velocity curves A and B, D and A, or any other co-acting intermediate combinations; the essential being that on account of the formation and phase relationship of the several control cams for the cylinders, the hydraulic output flow in the case of the pump or the mechanical rate of rotation in case the structure is being used as a motor, will be constant and uniform.

In the use of the mechanism as a pump, power is applied to shaft 34 to rotate same in any suitable manner, thus causing the several cams 33 to successively actuate pistons 32. At the same time there is preferably coupled with the shaft 34 the low pressure gear or other pump 43 for supplying the hydraulic medium as from reservoir 44 to the common intake 45 for the unit thus supercharging the pump. As indicated in Figures 1 and 2, this conduit may be a drilled passage in the main cylinder block cutting transversely through the several cylinders at a point to one side of the series of ports 29, the openings into the several cylinders being collectively indicated by the numeral 28.

Similarly, the exhaust or output line 46 coming from the various cylinders is shown as a passage likewise interconnecting with several cylinders at the opposite side of the ports 29, the port connections themselves being collectively numbered 30. By reference particulary to Figure 2, it will be seen that when the ports 28 are under pressure, this pressure, as illustrated, will be effective through cylinders C' and its ports to charge the pressure end of cylinder D', while at the same time cylinder B' is discharging through port in cylinder A' to the exhaust or output passage 46. As the cam shaft rotates, however, the piston 32 will descend, its lower end being maintained in contact with the actuating lever and cam by the initially created pressure in intake line 45 and at the same time, this movement of the piston will cause the intermediate spool portion 47 thereof to uncover the intermediate port 29 of cylinder D' when the hydraulic input fluid can enter the compression end of cylinder A'. In this manner as the several pistons reciprocate, the compression end of the various cylinders will be successively connected with the intake line to receive fluid under pressure or, in other words, to be supercharged and then subsequently to discharge same into the output line 46 at a constant volumetric output or flow, due to the controlled piston plunger movement, as previously described.

It will further be noted that by lateral displacement of the cylinder block with respect to the actuating shaft, the amount of movement of the individual pistons will be varied but as this is a linear displacement as respects the actuating units or ways on the various fulcrumed levers the cylinder adjustment will not in any way affect the normal intermediate or centralized position of the individual pistons in their cylinders. Consequently, the actuation of the pistons will cause equal amount of displacement in both directions from the central position covering ports 29 and thus the valve operation will be properly timed and entirely unaffected by the change in length of stroke and as of the ultimate volumetric displacement of the mechanism.

As previously mentioned, the power unit may be composed of any multiple of four cylinders to increase the capacity of the unit and this may be accomplished by duplicating the four in line to make eight in line or the same effect may be produced by substituting for the single lobe cams 33, double lobe cams 48, as shown in Figure 14, in which case each half of the cam will be formed so as to include the rise and fall of the cam 14, Figure 9, and thereby effect two cycles of movement of the piston for each revolution of the shaft 34. It will, therefore, be apparent that each piston may be given as many cycles of movement per revolution of the shaft as the actuating cam has lobes formed thereon. Thus the capacity of the device may be changed by simply increasing the number of lobes on the cam. It should be noted, however, that the phase relation between co-acting pistons should always be one quarter of a cycle and not necessarily one quarter of a revolution of the cam shaft.

As more particularly shown in Figures 10, 11, 12 and 13, the cylinders may be arranged in a radial fashion, as well as in line but the principle of operation will still remain the same. In this embodiment the pistons 32a will be reciprocably mounted in cylinders 22a formed in the casting 49 and if a simple four cylinder pump or motor is desired these cylinders will be arranged at 90° intervals about the axis of a driving shaft 34a. This shaft will have a cam 33a keyed thereto of similar form to one of the cams 33 of Figure 2, and it will be apparent that upon rotation of the cam in a clockwise direction and at the instantaneous moment shown in Figure 11, that one of the pistons will be moving out at a uniform acceleration while another will be moving out at a uniform deceleration, while the other two pistons will be moving inward toward the center on intake strokes. The periphery of the cam may be provided with flanges 72' to prevent relative twisting of the roller. Two annular grooves 45a and 46a are formed in one face of the casting, as shown in Figure 13, and closed by a cover plate 50, the groove 45a being connected with a source of supply and forming an intake channel, while the groove 46a will be connected with an external channel forming the output line. Holes, such as 51 and 52, may be drilled longitudinally of the casting to connect each intake and output channel with each cylinder on opposite sides of ports 29a. These ports are connected with the compression chambers 27' of the succeeding cylinders by channels 31a.

From the general construction of the radial type pump it will thus be seen that the principle of operation of the device is the same with the exception that the cylinders are radially arranged around a single cam but a uniform output of power is still obtainable. The capacity may be increased by using a plurality of lobes on the cam together with four times as many pistons as lobes.

The advantage of using the double lobe cam with eight plungers is more apparent in this construction because it eliminates all radial thrust on the bearing of the shaft 34a as the pistons 32a, which are acting on the cam 33a, will be acting equally and opposite to one another. The valve arrangement will still be the same in principle and operation.

Another manner in which the pistons may be arranged relative to their actuating cams is illustrated in Figure 15. In this figure the cam 33b takes the form of a double lobe face cam and the pistons 32b are arranged to be reciprocated by the cam parallel to the cam axis. A casting or pump body 53 is provided having an axial bore 54 in which is fitted a sleeve member 55 having a series of helical grooves 31b cut in the periphery connecting the valve port 29b of one cylinder with the port 27b in the compression chamber 27' of the next cylinder. The sleeve 55 is pinned in the bore 54 against movement and has a driving shaft 34b journaled therein upon the end of which is formed the cam 33b. The pump body has a reduced cylindrical surface 56 in which is cut a pair of annular grooves 45b and 46b, the annular groove 45b, which may be the intake channel, is of sufficient depth to intersect each cylinder and the annular groove 46b, which may be an outlet channel, also intersects each cylinder. These annular grooves are closed by a sleeve 57 which is shrunk onto the cylindrical surface 56 and has threaded therein the intake line 59 and the outlet line 58. The casting 53 may have a plurality of dovetailed slots 60 formed on the interior bore thereof, Figure 16, surrounding the cam 33b in each one of which is reciprocably mounted a dovetailed member 61 having integrally formed therewith a stud 62 on which is rotatably mounted a tapered roller 63. This roller is antifrictionally mounted on the stud 62 preferably by needle bearings. The dovetailed member 61 is mounted opposite to the end of the piston 32b. The surface 64 of the cam 33b is similar to the cam 14, but rolled into cylindrical form and having two lobes, although one lobe with four pistons could be used as well. It will thus be seen that rotation of the shaft 34b will cause the pistons 32b to reciprocate in the same manner and in the same phased relation as in the previously described constructions. In this construction, as in the others, the number of pistons 32b may be any multiple of four with the cam 33b formed with a corresponding number of lobes. In this construction the shaft 34b has a thrust bearing 65 interposed between a shoulder 66 on the casting and a collar 67 threaded on the end of the shaft with which cooperates a lock nut 68. By adjusting the collar 67 the cam 33b may be adjusted longitudinally so that the middle spool on the piston 32b will be in a position to close the port 29b when the cam roller 63 is at the half-way point in the rise of the cam.

From the foregoing description it will be noted that in all of these embodiments the pistons were not held in contact with the peripheral surfaces of the cam and in each instance it was assumed that the supercharging pressure of the gear pump 43 would maintain this contact. It, therefore, becomes necessary, when the device is utilized in connection with a tank where the liquid is withdrawn from a tank by hydrostatic or vacuum pressure, to provide other means to maintain the pistons in contact with the actuating cams so as to draw the fluid from the tank. This may be accomplished by counterboring each cylinder, as shown at 69 in Figure 17, to form a chamber 70 in the end of which reciprocates the block 36 carrying the antifriction roller 37, the block in this case being attached to the end of the piston. Each of these chambers will be closed but inter-connected with one another and the chambers and connecting passages filled with fluid. The operation is such that the fluid in one chamber, during inward stroke of its block 36, will flow through the connecting passage to the cylinder in which the sliding block is on its outward stroke. If the port 46b is the pressure port, there will be leakage from the chamber 46c to the chamber 70 through the bore in which the piston slides and there will also be leakage from the cylinder 69 past the block 36. The external pressure, as at the orifice of cylinder 69, will be zero while the pressure in the chamber 46c will be at a maximum or equivalent to the output pressure of the pump, and, therefore, the pressure in the chamber 70 will be intermediate these two pressures depending upon the resistance to leakage at opposite ends of the chamber 70. If these resistances are the same the pressure in the chamber 70 will be half-way between zero pressure and the pressure in chamber 46c. It should thus be apparent that after the chamber 70 has been filled with fluid that a suitable pressure will be maintained therein automatically thereafter by leakage from the pump's own output channel, or a separate channel may be provided for supplying this pressure if the normal leakage is found insufficient. With this construction it, therefore, is possible to withdraw fluid from an open tank without depending upon a supercharged source of pressure supply.

From the foregoing description it should now be apparent that a hydraulic unit has been produced which is capable of transmitting a uniform supply of power and in which the component parts are so designed that a plurality of forms and arrangements may be assembled all operating on the same basic principle with substantially the same results.

That which is claimed is:

1. A mechanism of the nature disclosed comprising a cylinder block having a quaternary number of cylinders, a port in each cylinder, intake and outlet channels formed in the block, valve means for successively coupling each port with the outlet channel, individual pistons reciprocably mounted in the respective cylinders, a shaft rotatably mounted in the cylinder block, cam means carried by the shaft engaging said pistons, said cam means comprising uniform piston accelerating and uniform piston decelerating portions formed in alternate succession upon the shaft, each portion constituting one quarter of a cycle of piston movement whereby upon each quarter cyclic movement of the shaft one piston will be moved to effect a uniformly increasing rate of displacement from its cylinder and simultaneously therewith another piston will be moved to effect a uniformly decreasing rate of displacement from its cylinder to thereby effect a constant, uniform volumetric flow in said output channel.

2. A device of the nature disclosed comprising a cylinder block having a quaternary number of cylinders, a port in each cylinder, intake and outlet channels formed in the block, valve means for successively coupling each port with the outlet channel if the device is utilized as a pump or with the inlet channel if the device is utilized as a motor, individual pistons reciprocably mounted in the respective cylinders, a shaft rotatably mounted in the cylinder block, cam means carried by the shaft for effecting reciprocation of said pistons, said cam means comprising uniform piston accelerating and uniform piston decelerating portions formed in alternate succession upon the shaft, each portion constituting one quarter of a cycle whereby upon each quarter cyclic movement of the shaft one piston will be moved to effect a uniformly increasing rate of volumetric change and simultaneously therewith another piston will be moved to effect a uniformly decreasing rate of volumetric change to thereby effect a constant, uniform flow of power from the device if utilized as a pump or actuation of the device at a uniform, constant rate if utilized as a motor.

3. A mechanism of the nature disclosed comprising a cylinder block having a plurality of cylinders formed in line therein, individual pistons reciprocably mounted in the respective cylinders, a rotatable shaft adjacent the cylinder block and extending in line therewith, said shaft having individual cam members secured thereon and rotatable therewith for cooperation with the individual pistons, said cams each having a portion of its rise of uniform acceleration and a merging equal portion of uniform deceleration, and the several cams being differently phased whereby the operative portion of uniform acceleration of one cam will be effective on its piston, while the decelerating portion of another cam correspondingly controls its piston during each quarter cyclic revolution of the shaft.

4. A mechanism of the nature disclosed comprising a cylinder block, a shaft journaled therein, a quaternary number of cylinders formed in the block and extending radially with respect to said shaft, individual pistons reciprocably mounted in the respective cylinders, cam means carried by the shaft for effecting said reciprocations, said cam means comprising uniform piston accelerating and decelerating portions formed in alternate quarter cyclic succession about said shaft, whereby rotation of the shaft through a quarter of a cycle will effect movement of one piston at uniform acceleration and another piston at uniform deceleration to effect a constant, uniform, volumetric flow from said mechanism.

5. A mechanism of the nature disclosed comprising a pump body having a shaft journaled therein, a quaternary number of cylinders formed in the body extending parallel to the shaft and equally, angularly displaced thereabout, individual pistons reciprocably mounted in the respective cylinders, a face cam carried by the shaft engaging said pistons for effecting reciprocation thereof, said cam having lobular portions for effecting uniform acceleration and uniform deceleration of the pistons formed in alternate quarter cyclic succession thereon whereby the volumetric flow of the mechanism is maintained constant.

6. A mechanism of the nature disclosed comprising a cylinder block having a plurality of cylinders formed in predetermined order therein, individual pistons reciprocably mounted in the respective cylinders, a rotatable shaft adjacent the cylinder block, said shaft having individual cam members secured thereon and rotatable therewith for advancing the individual pistons in the predetermined order of their cylinders, said cams having corresponding contours but differently phased, each contour consisting of a plurality of equal alternately arranged piston accelerating and piston decelerating portions, the phasing of said cams being equal to one of said portions whereby one piston will be advanced at a uniformly accelerated rate and a second piston at a uniformly decelerated rate during each quarter cyclic revolution of the shaft to produce a combined volumetric flow from two cylinders which is constant throughout a quarter cycle, and therefore constant throughout a full cycle.

7. A mechanism of the nature disclosed comprising a cylinder block having a plurality of cylinders formed in predetermined order therein, a delivery channel, individual pistons reciprocably mounted in the respective cylinders, a rotatable shaft adjacent the cylinder block, said shaft having individual cam members secured thereon and rotatable therewith for advancing the individual pistons in the predetermined order of their cylinders, said cams having corresponding contours but differently phased, each contour consisting of a plurality of equal alternately arranged piston accelerating and piston decelerating portions, the phasing of said cams being equal to one of said portions whereby any pair of pistons will produce jointly a constant volumetric flow in the delivery channel, valve means for coupling the cylinders in which the pistons are being advanced with said channel, a pressure supply line, and means for coupling the remaining cylinders thereto.

8. A mechanism of the class described comprising a cylinder block having a quaternary number of cylinders, a port in each cylinder, intake and outlet channels formed in the block, valve means for successively coupling the cylinder ports in predetermined order with one or the other of said channels, individual pistons reciprocably mounted in the respective cylinders for cyclic movement, each cycle consisting of a suction stroke and a delivery stroke, a shaft rotatably mounted in the cylinder block, means carried by the shaft engaging said pistons for effecting cyclic movements thereof, including individual cams each having a uniform piston accelerating portion, and a uniform piston decelerating portion for effecting the delivery stroke of a piston, and additional uniform piston accelerating and uniform piston decelerating portions for controlling the suction stroke of a piston, each of said portions being effective for a quarter revolution of the shaft, said cams being differently phased by an amount equal to one portion whereby the pistons will be jointly active by pairs to produce a uniform delivery to the output channel while the remaining pairs of pistons will be jointly active in withdrawing fluid at a uniformly volumetric rate from the intake channel.

9. A mechanism of the class described comprising a cylinder block having a quaternary number of cylinders, a port in each cylinder, intake and outlet channels formed in the block, valve means for successively coupling the cylinder ports in predetermined order with one or the other of said channels, individual pistons reciprocably mounted in the respective cylinders for cyclic movement, each cycle consisting of a suction stroke and a delivery stroke, a shaft rotatably mounted in the cylinder block, means carried by the shaft engaging said pistons for effecting cyclic movements thereof, including individual cams each having a uniform piston accelerating portion, and a uniform piston decelerating portion for effecting the delivery stroke of a piston, and additional uniform piston accelerating and uniform piston decelerating portions for controlling the suction stroke of a piston, each of said portions being effective for a quarter revolution of the shaft, said cams being differently phased by an amount equal to one portion whereby the pistons will be jointly active by pairs to produce a uniform delivery to the output channel while the remaining pairs of pistons will be jointly active in withdrawing fluid at a uniformly volumetric rate from the intake channel, and fluid pressure means for maintaining contact between the cams and their respective pistons during the suction stroke thereof.

10. A mechanism of the class described including a cylinder block having a plurality of cylinders with contained pistons, a port formed in each cylinder, intake and outlet channels formed in the block, valve means for successively coupling the cylinder ports in predetermined order with one or the other of said channels, said valve means including an intermediate spool portion and adjacent cannelures on each side thereof formed on each piston, individual ports in constant registry with the respective cannelures, an intermediate port associated with each piston and adapted to be blocked by the spool thereof when in an intermediate position whereby when the piston is displaced in either direction from said position a cannelure will couple said intermediate port with the respective port in register with the cannelure, connecting passages extending from each cylinder port to a respective intermediate port of an adjacent cylinder, said intake channel being connected with one cannelure port of all of said pistons, and said outlet channel being connected with the other cannelure port of all of said pistons, a shaft rotatably mounted in the cylinder block, means carried by the shaft for cyclically moving said pistons including individual cams, each having a uniform piston accelerating and uniform piston decelerating portion for effecting the delivery stroke of the piston, and additional uniform piston accelerating and uniform piston decelerating portions for controlling the suction stroke of the piston, said portions being arranged in the order named, and each effective for a quarter of a revolution of the shaft whereby the pistons will be jointly active by pairs to produce a uniform volumetric delivery to the output channel while the remaining pair of pistons will be jointly active in withdrawing fluid at a uniformly volumetric rate from the intake channel.

11. A mechanism of the class described including a cylinder block having a plurality of cylinders with contained pistons, a port formed in each cylinder, intake and outlet channels formed in the block, valve means for successively coupling the cylinder ports in predetermined order with one or the other of said channels, said valve means including an intermediate spool portion and adjacent cannelures on each side thereof formed on each piston, individual ports in constant registry with the respective cannelures, an intermediate port associated with each piston and adapted to be blocked by the spool thereof when in an intermediate position whereby when the piston is displaced in either direction from said position a cannelure will couple said intermediate port with the respective port in register with the cannelure, connecting passages extending from each cylinder port to a respective intermediate port of an adjacent cylinder, said intake channel being connected with one cannelure port of all of said pistons, and said outlet channel being connected with the other cannelure port of all of said pistons, a shaft rotatably mounted in the cylinder block, means carried by the shaft for cyclically moving said pistons including individual cams, each having a uniform piston accelerating and uniform piston decelerating portion for effecting the delivery stroke of the piston, and additional uniform piston accelerating and uniform piston decelerating portions for controlling the suction stroke of the piston, said portions being arranged in the order named, and each effective for a quarter of a revolution of the shaft whereby the pistons will be jointly active by pairs to produce a uniform volumetric delivery to the output channel while the remaining pair of pistons will be jointly active in withdrawing fluid at a uniformly volumetric rate from the intake channel, and means to vary the volume delivered per rotation of the shaft including fulcrum levers carried by fixed pivots in operative engagement with the cams for oscillation thereby, said levers being interposed between the cams and the respective pistons, and means for effecting a bodily lateral relative translation of the cylinder block relative to the levers to vary the effective movement of the pistons for a constant oscillation of the levers.

12. A mechanism of the class described comprising a cylinder block having a quaternary number of cylinders, a port in each cylinder, a first and second channel formed in the block, valve means for successively coupling the cylinder ports in predetermined order with one or the other of said channels, individual pistons reciprocably mounted in the respective cylinders for cyclic movement consisting of a forward and return stroke, a shaft rotatably mounted in the cylinder block, cam means carried by the shaft and engaging said pistons including alternately arranged uniform piston accelerating and uniform piston decelerating portions, each of said portions being effective for a quarter of a revolution of the shaft whereby rotation of the shaft will cause the pistons to be jointly active by pairs to effect a uniform delivery to the first of said channels and the remaining pair of pistons to be active in withdrawing fluid at a uniformly volumetric rate from the other channel thus causing the mechanism to act as a pump and whereby when the first channel is supplied with fluid pressure at a uniform rate the pistons will be active by pairs to jointly receive fluid at a uniform rate from said first channel to effect uniform rotation of said shaft and thus cause the mechanism to act as a motor.

BERNARD SASSEN.